Oct. 10, 1950         H. A. MOORE         2,525,705

VOLTAGE VARIATION INDICATOR

Filed Aug. 30, 1946

INVENTOR
HAROLD A. MOORE
BY
*H. S. Grover*
ATTORNEY

Patented Oct. 10, 1950

2,525,705

UNITED STATES PATENT OFFICE 2,525,705

VOLTAGE VARIATION INDICATOR

Harold A. Moore, Riverhead, N. Y., assignor to Radio Corporation of America, a corporation of Delaware Application August 30, 1946, Serial No. 694,073

5 Claims. (Cl. 171—95)

This application discloses a new and improved circuit arrangement for making instantaneous indications, which may be recorded, of variations in a voltage source. My improved system may be said to be a voltage regulated, differential voltage control for electrical instruments, recording voltage variations in the voltage supplying the differential control.

It has been found when working with electrical circuits in which an attempt has been made to buck down the major portion of a given voltage source, in an effort to create a voltage differential, in order to study the voltage variations of the given voltage source, that the source of bucking voltage, which is usually a battery, does not remain fixed in its voltage value, and therefore injects into the differential voltage an undesirable variable.

This is due to the fact that batteries of the type generally used, are prone to "charge" under these conditions and their voltage value slowly increase.

An object of my invention is to provide a new and improved voltage variation indicator entirely free of the defects discussed above.

Where a battery is used to provide the voltage bucking potential as described above, the range of operation of the meter and sensitivity of the system is fixed and use of the circuit is limited to meters having the proper voltage variation range.

It is a further object of my invention to provide a voltage variation meter of adjustable sensitivity and adjustable range such that the full scale of meters of various voltage ranges may be used therewith to adapt the system for use over a wide range of voltages variations of which are to be studied.

A further object of my invention is to provide a system of the nature described above wherein the bucking voltage although fixed is derived in a novel manner from the voltage variations which are being investigated. This eliminates entirely the need of a battery in the system.

Since the battery, used heretofore for bucking out the average of the voltage variations which are to be investigated, varies in operation, an exact balancing of the said average voltage is not possible. A further object of my invention is the provision of means by which a more critical balance may be had. This is attained as will be explained more in detail hereinafter by the use of voltage dividing networks which are continuously variable instead of batteries variable at best in steps only.

In describing my invention, reference will be made to the attached drawings wherein.

To simplify the description, I have assumed that the variable voltage to be observed has a magnitude of 125 volts. I have then also assumed appropriate values for the source B, Fig. 1, and for the resistors $R_1$, $R_2$, $R_3$ and $R_4$, Fig. 2, and selected voltage regulator tubes of appropriate types. It will be understood that voltages of other magnitudes may be investigated and resistors of other sizes used along with voltage regulator tubes of other types in accordance with my invention.

$R_1$ is assumed to be 2000 ohms.
$R_2$ and $R_3$ are assumed to be 5000 ohms each.
$R_4$ is assumed to be 1000 ohms.

Figure 1:
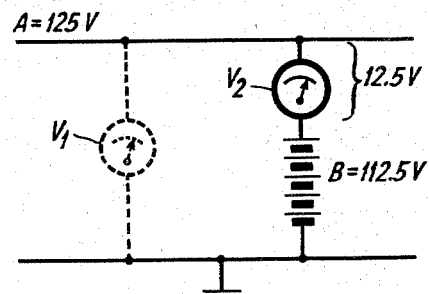
Fig. 1 illustrates a voltage variation observing system as known in the art. This figure is used to illustrate the need of my improved means which is illustrated in Figure 2.

Looking at Fig. 1, we see that if we have a voltage source A which is say 125 volts above ground and an attempt is made to observe the variations in the voltage value by means of the voltmeter $V_1$, it can be seen that a 5% variation in the 125 volt source ($\pm 6.25$ v.) will hardly be readable with any degree of accuracy and ease, and also this percentage variation in voltage is approaching the accuracy limits of many meters.

If a bucking voltage, B=112.5, is connected in series with a voltmeter of lower range $V_2$, and this combination is connected across the voltage source in question A, a voltage differential will be present (12.5 v. as per Fig. 1) which will be impressed across the voltmeter $V_2$. If voltmeter $V_2$ is made low in range, say 0–25 volts, then the deflection of 12.5 volts will be approximately half scale reading and a 5% variation of voltage A which is $\pm 6.25$ volts will appear as a much larger reading and can be read with a greater degree of accuracy. This shows the advantage of using the differential voltage means for making such a measurement or observation.

The disadvantage of this arrangement is the fact that the voltage source B, which is usually a battery and is desired to remain constant in output value, takes on a "charge" from the voltage source A and we find the voltage of the source B slowly increasing, which changes the degree of differential. This means that a constant check must be maintained on the voltage B in order to interpret the values of the variations. This problem becomes very great when the meter $V_2$ happens to be of a recording variety. This variation in differential will cause the recording to wander over the chart and thereby destroy the record.

I propose to show, with the following invention, that it is possible to overcome this problem by means of a circuit which will give a constant voltage, and also to show that this constant voltage can be obtained from the variable source being measured or observed.

Figure 2:
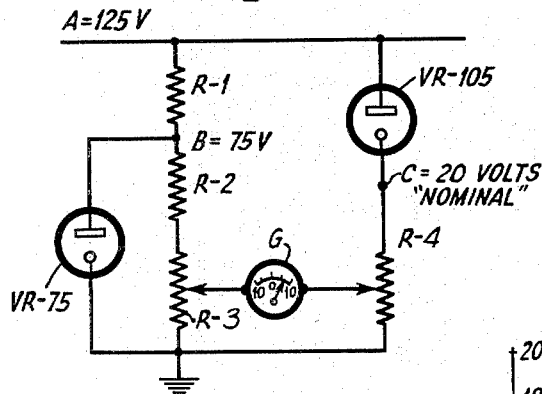
Figure 3:
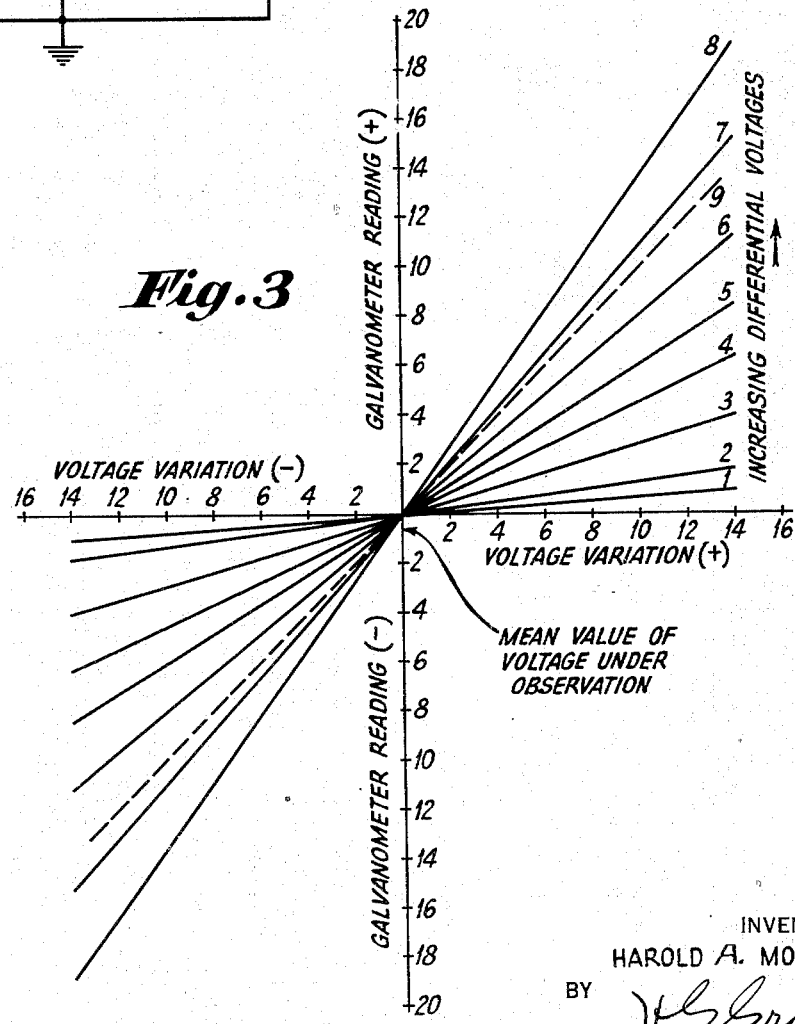
Figure 3 shows by curves the characteristics of the readings taken on the meter in my system, the range of readings which may be taken, etc.

With reference to Fig. 2, it will be observed that there are two circuits between the 125 volt source A and ground. Examining the left hand branch it is seen that there are three resistors, R—1 of 2000 ohms, R—2 of 5000 ohms, and R—3 of 5000 ohms in series to ground. It can also be seen that a voltage regulator tube VR—75 connects from a point between resistors R—1 and R—2 (point B) to ground, while the 2000 ohm resistor R—1 acts as a voltage feed from the source A.

The voltage regulator tube, VR—75, by its inherent nature, holds the junction point B to very close tolerances at 75 volts, with quite a wide range in voltage variation of the source A. With the voltage regulator tube holding the point B fixed, then all variations in voltage in this network are dissipated in the resistor R—1. This means that the voltage across the resistors R—2 and R—3 will be held constant and any point on these resistors will be constant.

The next network from A to ground (right hand) consists of, in series, a voltage regulator tube VR—105 and a 1000 ohm potentiometer R—4. The VR—105 tube, because of its inherent nature, will hold a fixed voltage across its terminals in a circuit as is herein used, and the low voltage side will produce a nominal voltage of 20 volts across the resistor R—4.

This property of the voltage regulator tube, VR—105, to maintain a constant voltage across itself of 105 volts means that the point C will of necessity follow all variations in the source voltage A, and therefore, these variations will be dissipated over the resistor R—4 and all points of the resistance R—4 will vary in voltage a proportional amount of the variation of the source at A. We now have a constant voltage source in resistor R—3 and a variable voltage source in R—4.

If we now connect an indicating device such as a meter G between the arms of the potentiometers R—3 and R—4 and adjust both arms to zero or ground potential, then there will be no current flow through the meter, even if the voltage variations in R—4 were considerable.

If the potentiometers are adjusted up from ground potential by a small amount, the fixed or constant potential in R—3 can be made equal to the mean value of the variable voltage in R—4, and as a result only the proportional variable voltage present in R—4 will be indicated in the meter circuit. If the meter element is extremely sensitive, or the voltage variations quite large, a low setting on the potentiometers may be sufficient.

If the voltage variations in A are small and it is desired to get most or all of these variations, then the arm of potentiometer R—4 can be set to take in all of the 1000 ohms, and by adjusting the arm of potentiometer R—3 to the proper value of voltage so as to buck out the mean value of variable voltage, then the combination is at its maximum sensitivity for that given instrument.

This system works nicely when a zero center instrument is used and plus and minus variations are being observed. When a recorder is being used, and the mean value is desired at the center of the chart, then proper adjustment of the potentiometer controls will enable the record to be placed properly on the chart.

Also, if the recording meter is a sensitive device, with a particular scale it is possible to make adjustments so as to cover the full range of the variations and fill the chart or make a narrow trace, or also to calibrate the recorder to specific scale values to fit the variation ranges conveniently.

Referring to the graph of "Differential Curves," a word of explanation may be advisable. The vertical line or ordinate is the mean value of voltage under observation and along the abscissa is plotted the voltage variation or deviation from this mean value. The ordinate is scaled off from the abscissa and indicates the deflections of a center scale galvanometer G. If the differential control resistor R—4, is adjusted for low differential values, (slightly above ground potential) and then the balance control R—3 is adjusted to give zero galvanometer reading on mean voltage values then the first curve #1 will be had when the voltage A is allowed to deviate from the mean value. It will be seen from this curve that with a deviation of ±14 volts, the galvanometer reading was 0.9. This may or may not fit the scale on this or any other meter, so by a proper adjustment of R—4 and R—3 the range can be made to fit the scale and sensitivity of the meter element. Suppose for instance that the galvanometer had a 10–0–10 scale and it was desirable to fill this scale with a voltage deviation of ±10 volts. Then, with a proper adjustment of the differential potentiometer R—4 and the balance potentiometer R—3, the curve #9 could be had and the galvanometer would be direct reading.

If the voltage variations of the supply under observation are always caused to deviate from a fixed voltage value and in one polarity, then the values of R—4 and R—3 can be made such that a conventional scaled meter can be used.

In practice, this circuit arrangement overcomes the drift or battery charge error in previous circuits and does away with the problems of battery maintenance, because the stable voltage may be had from the variable source being measured. Moreover, a more critical balance may be had with this system because voltage dividing networks are used instead of batteries of definite voltage steps. In addition, this circuit is an improvement over the older circuit because the differential control permits the circuit to become direct reading.

What is claimed is:

1. In apparatus for observing variations in magnitude of voltage having a substantially constant average magnitude, a first path including a plurality of resistors in series across which said voltage is applied, a voltage regulator in shunt to one resistor for establishing a substantially constant potential drop across at least said one of said resistors irrespective of variations in the magnitude of said voltage, a second path including at least one resistor and a second voltage regulator in series across which said voltage is applied, and a voltmeter connected between a point on said one resistor of said first path and a point on said one resistor of said second path.

2. In apparatus for observing variations in magnitude of voltage appearing across two points, a first path including a plurality of resistors in series connecting one of said points to the other point, means for establishing a substantially constant potential drop across at least one of said resistors adjacent said other point irrespective of variations in the magnitude of said voltage, a second path across said points including at least one resistor adjacent said other point across which a potential drop is produced, the magnitude of which varies proportionally with variations in the magnitude of said first voltage, and a voltmeter connected between a point on said one resistor across which a substantially constant potential drop is developed and a point on said one resistor in said second path.

3. In apparatus for observing variations in magnitude of voltage appearing across two points, a first path including a plurality of resistors connecting one of said points to the other point, a voltage regulator tube in shunt to at least one of said resistors adjacent said other point for establishing a substantially constant potential drop across at least said one of said resistors adjacent said other point irrespective of variations in the magnitude of said voltage, a second path across said points including a voltage regulator tube in series with at least one other resistor which is adjacent said other point in which other resistor a potential drop is produced, the magnitude of which varies proportionally with variations in the magnitude of said first voltage, and a voltmeter connected between points on said one resistor in each of said paths.

4. In apparatus for investigating variations in magnitude of a voltage having a substantially constant average value, a first path including a plurality of impedances in series connected across the source of voltage being investigated, means for establishing a substantially constant potential drop across at least one of said impedances irrespective of variations in the magnitude of said voltage, whereby a fraction of said voltage having a constant value appears across said one impedance, a second path including a voltage regulator tube and an impedance in series connected across the voltage source, a fraction of said investigated voltage appearing across said last-named impedance which last-mentioned fractional voltage varies in magnitude in accordance with variations in the magnitude of said investigated voltage, and means, connected between points on said one impedance of said first path and on said impedance of said second path, for indicating potential differences between such points.

5. In apparatus for investigating variations in magnitude of a voltage having a substantially constant average value, a first path including a plurality of resistors in series connected directly across the source of voltage being investigated, means for establishing a substantially constant potential drop across at least one of said resistors irrespective of variations in the magnitude of said voltage, whereby a fraction of said voltage having a constant value appears across said one resistor, a second path including an impedance and a resistor in series connected across the voltage source, a fraction of said investigated voltage appearing across said last-named resistor which last-mentioned fractional voltage varies in magnitude in accordance with variations in the magnitude of said investigated voltage, and a volt meter connected between points on said two resistors across which fractional voltages appear.

HAROLD A. MOORE.

REFERENCES CITED

The following references are of record in the file of this patent:

UNITED STATES PATENTS

| Number | Name | Date |
|---|---|---|
| 2,166,935 | Adams | July 25, 1939 |
| 2,374,248 | Tuttle | Apr. 24, 1945 |
| 2,389,991 | Mayle | Nov. 27, 1945 |